(12) United States Patent
Burgers et al.

(10) Patent No.: US 9,638,475 B2
(45) Date of Patent: May 2, 2017

(54) HEAT EXCHANGER AND BATTERY UNIT STRUCTURE FOR COOLING THERMALLY CONDUCTIVE BATTERIES

(75) Inventors: John G. Burgers, Oakville (CA); Michael A. Martin, Hamilton (CA)

(73) Assignee: Dana Canada Corporation, Oakville, Ontario (CA)

(*) Notice: Subject to any disclaimer, the term of this patent is extended or adjusted under 35 U.S.C. 154(b) by 814 days.

(21) Appl. No.: 13/282,675

(22) Filed: Oct. 27, 2011

(65) Prior Publication Data

US 2012/0107663 A1 May 3, 2012

Related U.S. Application Data

(60) Provisional application No. 61/407,972, filed on Oct. 29, 2010.

(51) Int. Cl.
| | |
|---|---|
| *H01M 10/6556* | (2014.01) |
| *F28F 3/06* | (2006.01) |
| *H01M 10/6568* | (2014.01) |
| *H01M 10/643* | (2014.01) |
| *H01M 10/6565* | (2014.01) |
| *H01M 10/613* | (2014.01) |

(52) U.S. Cl.
CPC .............. *F28F 3/06* (2013.01); *H01M 10/613* (2015.04); *H01M 10/643* (2015.04); *H01M 10/6556* (2015.04); *H01M 10/6565* (2015.04); *H01M 10/6568* (2015.04)

(58) Field of Classification Search
CPC ........... H01M 10/5004; H01M 10/613; H01M 10/6556; H01M 10/6551; F28F 3/06; Y02E 60/12

USPC ......................................................... 429/120
See application file for complete search history.

(56) References Cited

U.S. PATENT DOCUMENTS

| | | | |
|---|---|---|---|
| 5,356,735 A | 10/1994 | Meadows et al. | |
| 5,756,227 A | 5/1998 | Suzuki et al. | |
| 5,817,434 A * | 10/1998 | Brooker et al. | ................. 429/49 |
| 6,273,186 B1 * | 8/2001 | Ognibene et al. | ............. 165/185 |
| 6,858,344 B2 | 2/2005 | Marukawa et al. | |
| 2002/0006544 A1 * | 1/2002 | Asaka et al. | ..................... 429/99 |
| 2003/0059670 A1 * | 3/2003 | Bechtold et al. | ................ 429/94 |
| 2009/0236161 A1 * | 9/2009 | Meier et al. | ................. 180/68.5 |
| 2009/0325059 A1 | 12/2009 | Niedzwiecki et al. | |

(Continued)

FOREIGN PATENT DOCUMENTS

| | | |
|---|---|---|
| CN | 101385187 A | 3/2009 |
| CN | 101772857 A | 7/2010 |

(Continued)

*Primary Examiner* — Ula C Ruddock
*Assistant Examiner* — Thomas Parsons
(74) *Attorney, Agent, or Firm* — Marshall & Melhorn, LLC (57) ABSTRACT

A heat exchanger and battery unit structure is provided for cooling battery units (or cells) where the thermally conductive nature of the battery forms a cooling path. The heat exchanger is in the form of a cooling element provided with an engaging device formed on or attached to an outer surface of the cooling plate for receiving and/or engaging with a corresponding engaging portion on a battery unit (or cell). The interconnection between the battery unit (or cell) and heat exchanger creates a mechanical interlock between the two components that results in improved heat transfer properties between the two components.

19 Claims, 10 Drawing Sheets

(56) References Cited

U.S. PATENT DOCUMENTS

2010/0330408 A1* 12/2010 Yoon et al. .................. 429/120
2011/0003187 A1   1/2011 Graaf et al.
2011/0104545 A1*  5/2011 Meintschel et al. .......... 429/120

FOREIGN PATENT DOCUMENTS

| CN | 101855748 A | 10/2010 |
| CN | 101861665 A | 10/2010 |
| WO | 2010056750  | 5/2010  |

* cited by examiner

HEAT EXCHANGER AND BATTERY UNIT STRUCTURE FOR COOLING THERMALLY CONDUCTIVE BATTERIES

CROSS REFERENCE TO RELATED APPLICATION

The present application claims priority to U.S. provisional application Ser. No. 61/407,972 filed on Oct. 29, 2010, and incorporated by reference in its entirely herein.

TECHNICAL FIELD

The present disclosure relates generally to the cooling of thermally conductive batteries by mechanical interlock.

BACKGROUND

Different types of battery cells, such as a round cell, a prismatic cell or a pouch cell are known. In the case of a round cell or a prismatic cell, the active material, containing the electrodes and separators, is generally rolled up into a coil and placed in a robust aluminum housing. In the case of the pouch cell, the individual layers of the active material are stacked or folded, and packaged into a flexible aluminum composite film.

In operation, a current flow, either a charge or discharge, generates heat due to both electrochemical and electrical impedance effects. Due to temperature limitations at both low and high temperatures it is desirable to control an operating temperature range for batteries to ensure optimal performance of the battery.

Various heat exchanger structures and battery unit arrangements have been developed for providing cooling (and/or heating) to thermally conductive batteries. For instance, it is known for heat to be dissipated or transported from (or to) the exterior surfaces of the battery housing by (i) exposing the external surfaces to circulating air or by (ii) pressing a chilled (or heated) surface, whether it be a fluid-carrying heat exchanger cooling plate or a non-fluid carrying metallic conduction plate either between or in contact with battery cell surfaces. When the battery cell surfaces are in contact with a chilled (or heated) surface, there is concern with regard to thermal contact resistance and thermal constriction resistance as well as the mechanical aspects of maintaining sufficient contact/pressure between the two, especially in the application of automotive power batteries. As well, the contacting surfaces themselves must be sufficiently conformal to allow for good thermal contact between the battery unit and the cooling plate. When the battery cell surfaces are cooled by exposing the surfaces to circulating air, the spacing-apart of individual battery units or cells results in increased space allowances. As well, this method has more limited cooling effects and also makes it more difficult to recover heat for uses in other vehicle systems. Accordingly, known methods for cooling batteries tend to have high costs, increased space and/or weight penalties, as well as high tolerance requirements, all of which are desirable to overcome.

SUMMARY OF THE INVENTION

In one aspect, the present disclosure relates to a heat exchanger and battery unit structure, having at least one battery unit having an outer housing, the outer housing having a base portion; at least one heat exchanger plate having spaced-apart first and second walls defining a fluid channel therebetween, the heat exchanger plate having a fluid inlet and a fluid outlet in communication with said fluid channel; a first engaging device formed on or attached to the outer housing of the battery unit; a second engaging device formed on or attached to an outer surface of at least one of the first and second walls of the heat exchanger plate; wherein one of the first engaging device and the second engaging device is received within the other of the first engaging device and the second engaging device such that the at least one battery unit and the at least one heat exchanger plate are locked together upon engagement of the first and second engaging devices.

In one embodiment, the disclosure relates to a heat exchanger and battery unit system, wherein the at least one heat exchanger plate comprises a pair of mating first and second plates.

In another embodiment, the disclosure relates to a heat exchanger and battery unit system, furthering containing a turbulizer positioned in the fluid channel of the at least one heat exchanger plate.

In a further embodiment, the disclosure relates to a heat exchanger and battery unit system, furthering including an electrical isolation layer positioned between the first and second engaging devices of the at least one battery unit and at least one heat exchanger plate, the electrical isolation layer being engaged therewith.

In a still further embodiment, the disclosure relates to a heat exchanger and battery unit system, wherein the at least one battery unit is a plurality of battery units and the base portion is in the form of a current collector plate, the plurality of battery units being spot welded to the current collector plate.

In another further embodiment, the disclosure relates to a heat exchanger and battery unit system, further including an electrical isolation layer positioned between the current collector plate and the heat exchanger plate.

In another still further embodiment, the disclosure relates to a heat exchanger and battery unit system, wherein the first engaging device has a base plate coupled to a plurality of spaced-apart protruding members, the plurality of spaced-apart protruding members adapted for releasably-affixing the battery unit.

In a still further embodiment, the disclosure relates to a heat exchanger and battery unit system, wherein the first engaging device has a plurality of spaced-apart protruding members coupled to the second engaging device, the plurality of spaced-apart protruding members adapted for releasably-affixing the battery unit.

In one embodiment, the disclosure relates to a heat exchanger and battery unit system, wherein the protruding member is a fin.

In another embodiment, the disclosure relates to a heat exchanger and battery unit system, wherein the fins are welded, brazed or soldered to the base plate of the first engaging device.

In a further embodiment, the disclosure relates to a heat exchanger and a heat exchanger and battery unit system, wherein the outer housing of the battery is a hard case or is a flexible pouch.

In a still further embodiment, the disclosure relates to a heat exchanger and battery unit system, wherein the protruding member further contains a biasing means for biasing movement of the protruding member.

In still another further embodiment, the disclosure relates to a heat exchanger and a heat exchanger and battery unit system, wherein the biasing means is a generally S-shaped structure.

In another further embodiment, the disclosure relates to a heat exchanger and battery unit system, wherein the battery is in contact with or is spaced from the first wall of the heat exchanger.

BRIEF DESCRIPTION OF THE DRAWINGS

Embodiments of the present disclosure will now be described, by way of example only, with reference to the attached Figures, wherein.

DESCRIPTION OF THE EXAMPLE EMBODIMENTS

Figure 1:
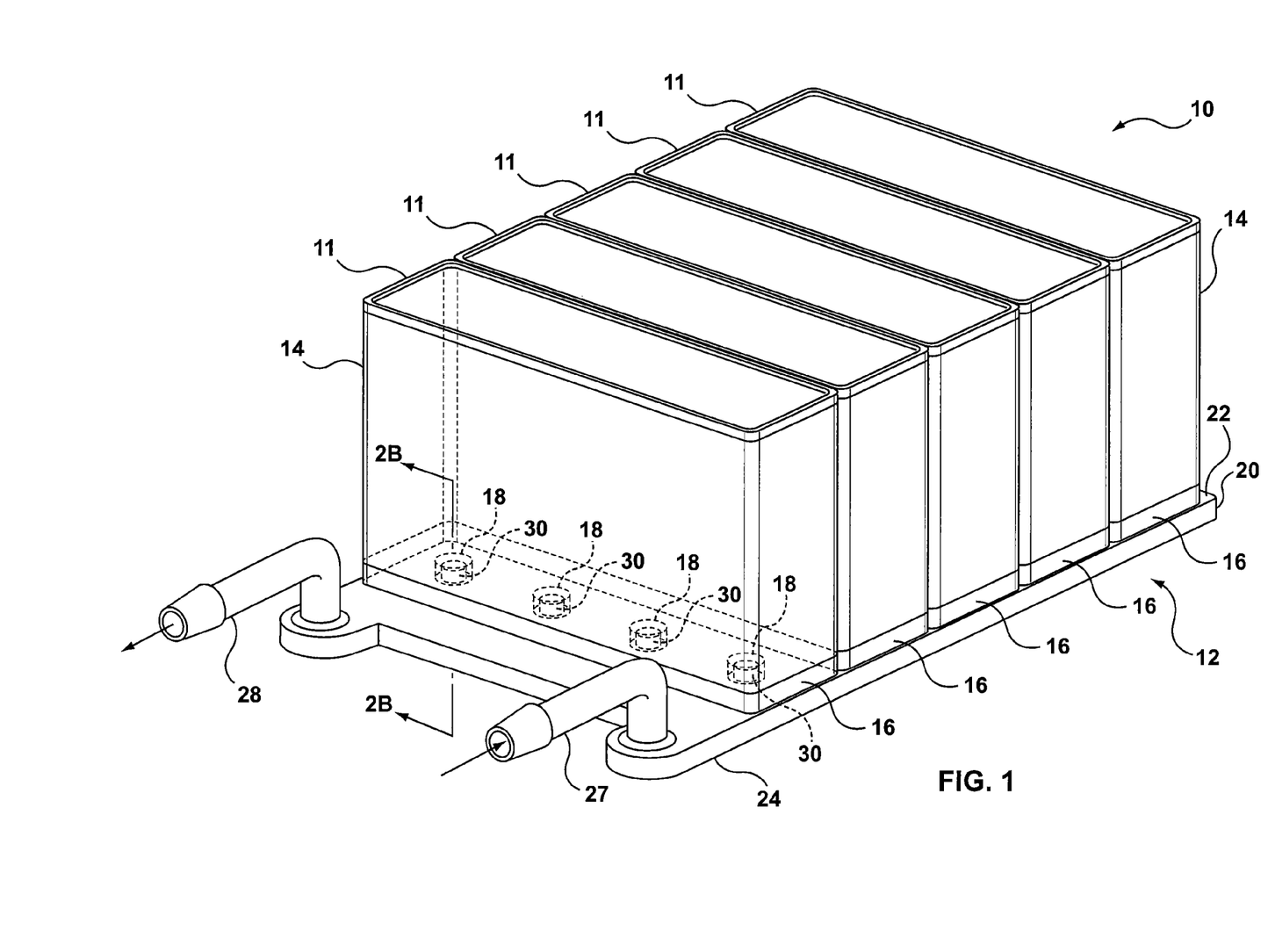
FIG. 1 is a perspective view of a battery unit and heat exchanger structure according to one example embodiment of the present disclosure.

Referring now to the drawings, FIG. 1 shows a module 10 comprising five battery units 11 and a heat exchanger structure 12, according to one example embodiment of the present disclosure. While five battery units 11 have been shown, it will be understood that the subject embodiment is not intended to be limited to five battery units and that the heat exchanger structure 12 may be adapted to accommodate more or less battery units 11, depending upon the particular application of the device.

As shown, each battery unit 11 comprises an outer case or housing 14 that houses the internal components (not shown) of the battery unit 11, as is known in the art. In the subject embodiment, the outer housing 14 is constructed on a welded or an extruded base portion 16 having a first engaging device formed therein. In some embodiments, the base portion 16 may be formed of aluminum or steel and may be impact formed or formed as a welded assembly. In the embodiment shown, the first engaging device is in the form of a plurality of sockets or recessed openings 18 formed in the bottom surface of the base portion 16 of the battery unit 11. The recessed openings 18 are spaced-apart along the length of the outer housing 14 at predetermined intervals based on the particular design and application of the battery unit 10 and heat exchanger structure 12.

Figure 6:
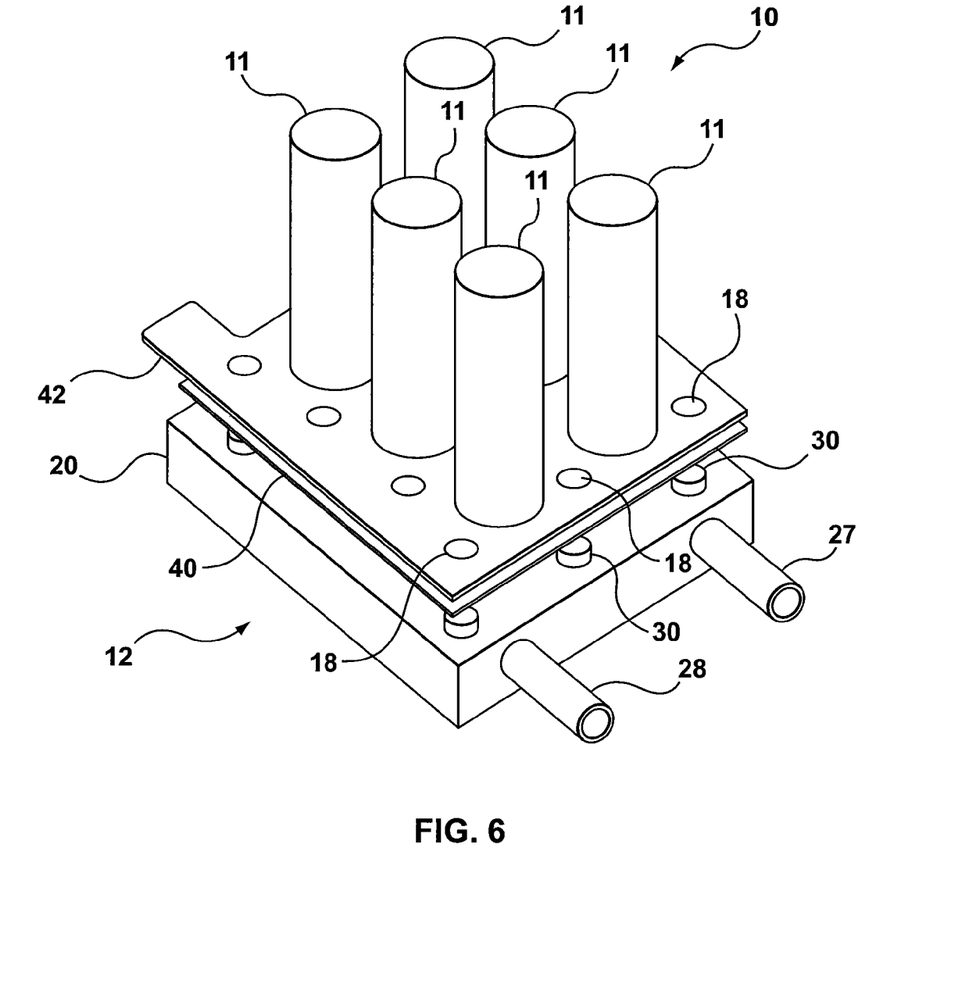
FIG. 6 is a perspective view of a battery unit and heat exchanger structure according to another example embodiment of the present disclosure.

In order to provide cooling to the individual battery units 11, a heat exchanger structure 12 in the form of a cooling element or plate 20 is provided. In general, the cooling plate 20 is a flat, tubular member with spaced-apart first and second walls 22, 24 that define a fluid channel 26 therebetween. The cooling plate 20 is in communication with fluid inlet and outlet structures 27, 28 for directing fluid into and out of the fluid channel 26. While the fluid inlet and outlet structures 27, 28 have been shown as being formed on and extending outwardly and away from the outer surface of the cooling plate 20, in some embodiments, the fluid inlet and outlet structures 27, 28 may instead be formed on the perimeter of the cooling plate 20 (for example as shown in FIG. 6). Additionally, while the fluid inlet and outlet structures 27, 28 have been shown as being formed on the same end of the cooling plate 20, it will be understood that the inlet and outlet structures 27, 28 may instead be formed on opposed ends of the cooling plate 20, i.e. the inlet structure 27 being formed on one end of the cooling plate 20 with the outlet structure 28 being formed on the opposite end of the cooling plate 20.

Figure 7:
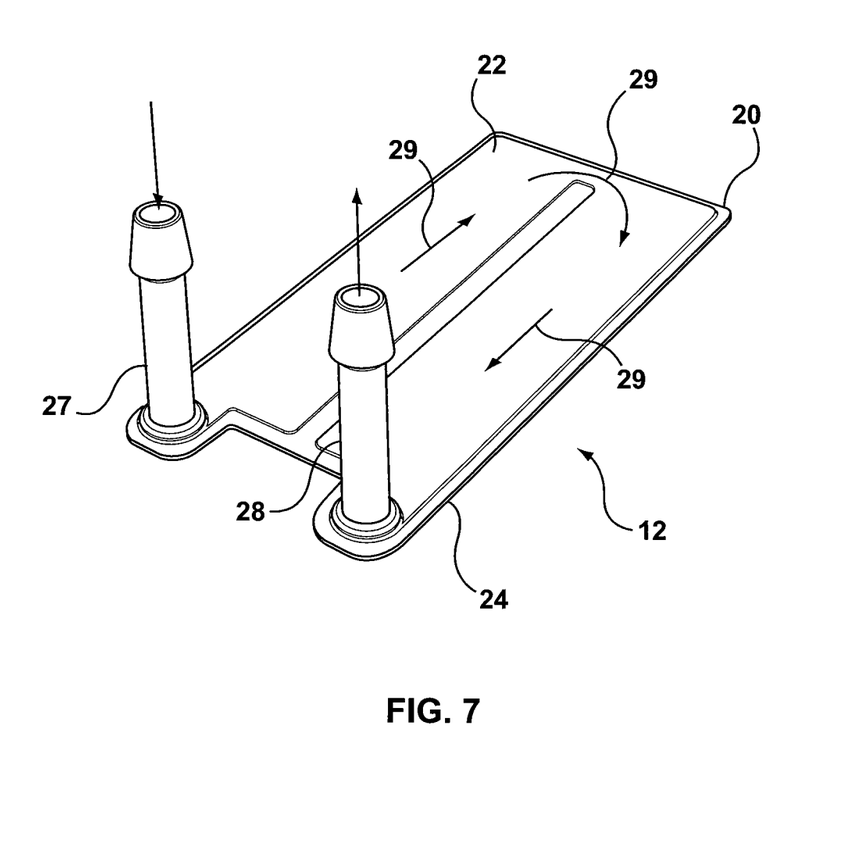
FIG. 7 is a perspective view of an example heat exchanger structure.

With regard to fluid passage 26, it will be understood that the fluid channel 26 may be in the form of any, generally serpentine flow path through the cooling plate 20 that provides the desired heat exchange profile for cooling (and/or heating) the battery units 11. For instances, fluid channel 26 may be generally U-shaped (for example in instances where the inlet and outlet structures 27, 28 are formed on the same side of the cooling plate 20), or may take on the form of any serpentine or circuitous route through the cooling plate 20 from one end to the other (i.e. in instances where the inlet/outlet structures are formed on opposed sides of the cooling plate 20). FIG. 7 shows an example cooling plate 20, without the second engaging device or protruding members formed thereon, so as to more clearly illustrate the example U-shaped flow path (see flow arrows 29) through fluid channel 26. In other embodiments, the fluid channel 26 may have a cross-section that corresponds to a substantial part of the cross-section of the cooling plate 20, or may instead be limited to a much smaller cross-section wherein the fluid channel 26 is formed about the perimeter of the cooling plate 20. Accordingly, it will be understood that the fluid channel 26 does not necessarily flow under the entire bottom surface of the battery units 11 but may have many different forms depending upon the particular design of the cooling plate 20, and the intended application and desired heat transfer requirements for the device, in general.

Figure 2A:
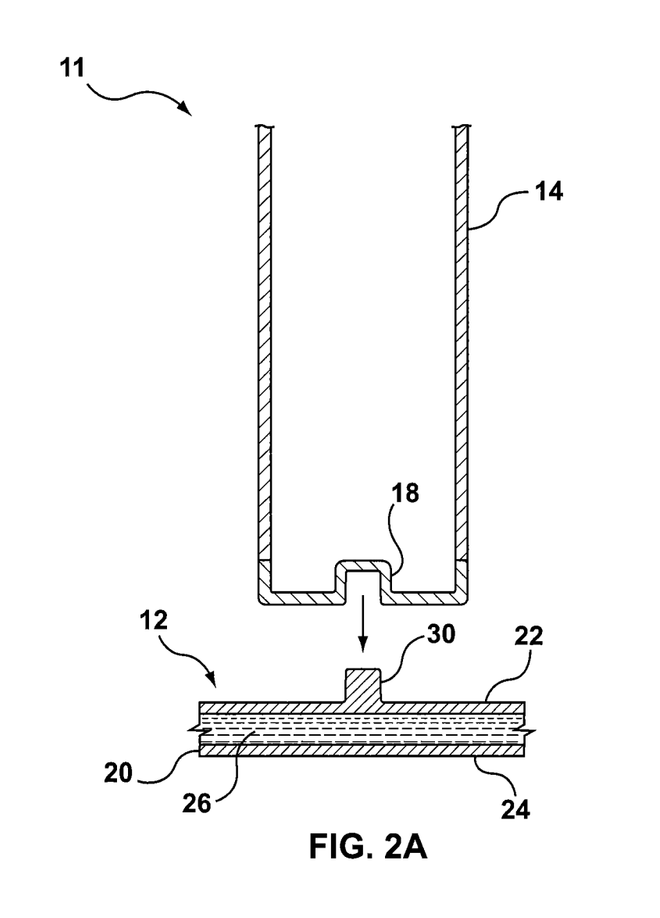
FIG. 2A is a partial sectional, assembly view taken along section line 2B-2B of FIG. 1 of one of the battery units being assembled on the heat exchanger structure.
Figure 2B:
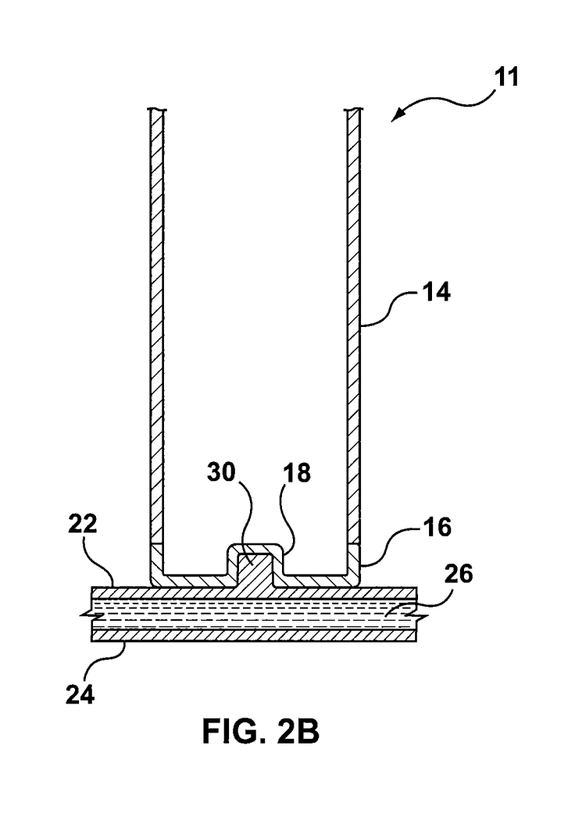
FIG. 2B is a partial sectional view taken along section line 2B-2B of FIG. 1 of the assembled battery unit and heat exchanger structure of FIG. 2A.

One of the first and second walls 22, 24 of the cooling plate 20 is provided with a second engaging device which cooperates with the first engaging device on each battery unit 11. In the subject embodiment, the second engaging device is in the form of "pegs" or protruding members 30 which are welded or brazed or soldered, for example, to the outer surface of the first or second wall 22, 24 of the cooling plate 20. In other embodiments, the protruding members 30 may be formed in the first or second wall 22, 24. The protruding members 30 are arranged at spaced-apart intervals along the length of the cooling plate 20 so as to correspond to the locations of the plurality of recessed openings 18 formed in the base portion 16 of the battery unit 11. As the battery unit 11 is positioned on and brought into contact with the cooling plate 20 (see FIG. 2A), the protruding members 30 are received in the recessed openings 18, similar to a "peg and socket" arrangement thereby creating a mechanical interlock between the first engaging device on the battery unit 11 and the second engaging device on the heat exchanger structure 12. As a result of the engagement between the protruding members 30 and the recessed openings 18, the battery unit 11 is locked to cooling plate 20 as the two components are pressed together. Depending upon the particular application and exact structure of the first and second engaging devices, the battery unit 11 may be removably or irremovably locked to the cooling plate 20. The pressing together of the battery unit 10 and the cooling plate 20 results in sufficient contact and pressure between the two components to achieve desirable cooling results. More specifically, the mechanical interlock between the battery unit 10 and the cooling plate 20 provided by the "peg and socket connection" of the protruding members 30 and recessed openings 18 enables the battery unit 10 and the cooling plate 20 to resist mechanical load and temperature variation, which often results in separation between a battery unit and its respective cooling plate in prior art arrangements, thereby allowing for improved temperature control of the overall unit.

Furthermore, the mechanical interlock provided by the "peg and socket connection" of the protruding members 30 and recessed openings 18 provides for a generally low thermal resistance between the battery unit 11 and the cooling plate 20 when compared to other heat flow path thermal resistances. As well, the number of recessed openings 16 and corresponding protruding members 30, as well as their spatial distribution on the cooling plate 20, is selected so as to minimize thermal constriction (conduction) resistance in both the outer housing 14 of the battery unit 11 and the cooling plate 20.

Additionally, by individually connecting the battery units 11 to the cooling plate 20, the need for binding a plurality of battery units 11 (or cells) into modules is reduced. As well, the requirement for the individual battery units 11 and the cooling plate 20 to have flat or otherwise conformal contact surfaces, as is required in a number of known prior art arrangements, is no longer of great concern since the connection or contact between the battery unit 11 and the heat exchanger structure 12 is provided by the mechanical engagement between the first and second engaging devices i.e. the recessed openings 18 and the protruding members 30, and does not rely solely on the apparent contact between two, corresponding surfaces.

While the example embodiment has been described with the battery unit 11 having a base portion 14 formed with recessed openings 18 and the cooling plate 20 having the protruding members 30, it will be understood by persons skilled in the art that the reverse arrangement, i.e. having the base portion 16 of the battery unit 11 being formed with the protruding members 30 with recessed openings 18 being formed on one of the first and second walls 22, 24 of the cold plate 20, is also possible and may be desirable based on the particular application and/or design of the overall heat exchanger and battery unit structure. As well, while the heat exchanger structure 12 has been shown as a generally, rectangular tubular member with spaced-apart walls 22, 24, it will be understood that the heat exchanger structure 12 may instead be formed of a pair of mating plates which are brazed or suitably joined together to create fluid channel 26 therebetween. Additionally, as briefly described above, the fluid channel 26 may be in the form of a generally U-shaped flow path extending from the inlet structure 27 to the outlet structure 28 to ensure that the cooling fluid entering and exiting the heat exchanger structure 12 flows along the entire length of the cooling plate 20. The U-shaped flow path may be formed by corresponding inwardly depending ribs formed on the inner surfaces of each of the first and second walls 22, 24 or by means of a baffle member inserted within the fluid channel 26. Whether the fluid channel 26 is U-shaped or has any other form, the fluid channel 26 may also be equipped with additional heat transfer enhancing devices such as turbulizers positioned in the fluid channel 26 or inwardly disposed dimples formed on the inner surfaces of the first and second walls 22, 24, for instance, which increase turbulence in the fluid flowing through the channel 26 which serves to increase heat transfer effectiveness, as is known in the art.

Accordingly, the above-described example embodiment is not intended to be limited to the particular arrangement described or shown in the associated drawings. Furthermore, while the first and second engaging devices have been described as comprising, respectively, recessed openings 18 and protruding members 30, it will be understood that the first and second engaging devices may be in the form of any suitable corresponding, engaging structures provided on the cooperating surfaces of the battery unit 11 and the heat exchanger structure 12 which serve to create a mechanical interlock between the battery unit(s) 11 and the heat exchanger structure 12.

Furthermore, while the example embodiment has been described in connection with battery units 11 formed in the shape of generally rectangular cells, it will be understood by persons skilled in the art that the battery unit 11 may be in one of many different forms including, but not limited to, battery units in individual cylindrical or rectangular outer casings or housings, or any other prismatic form.

Figure 3:
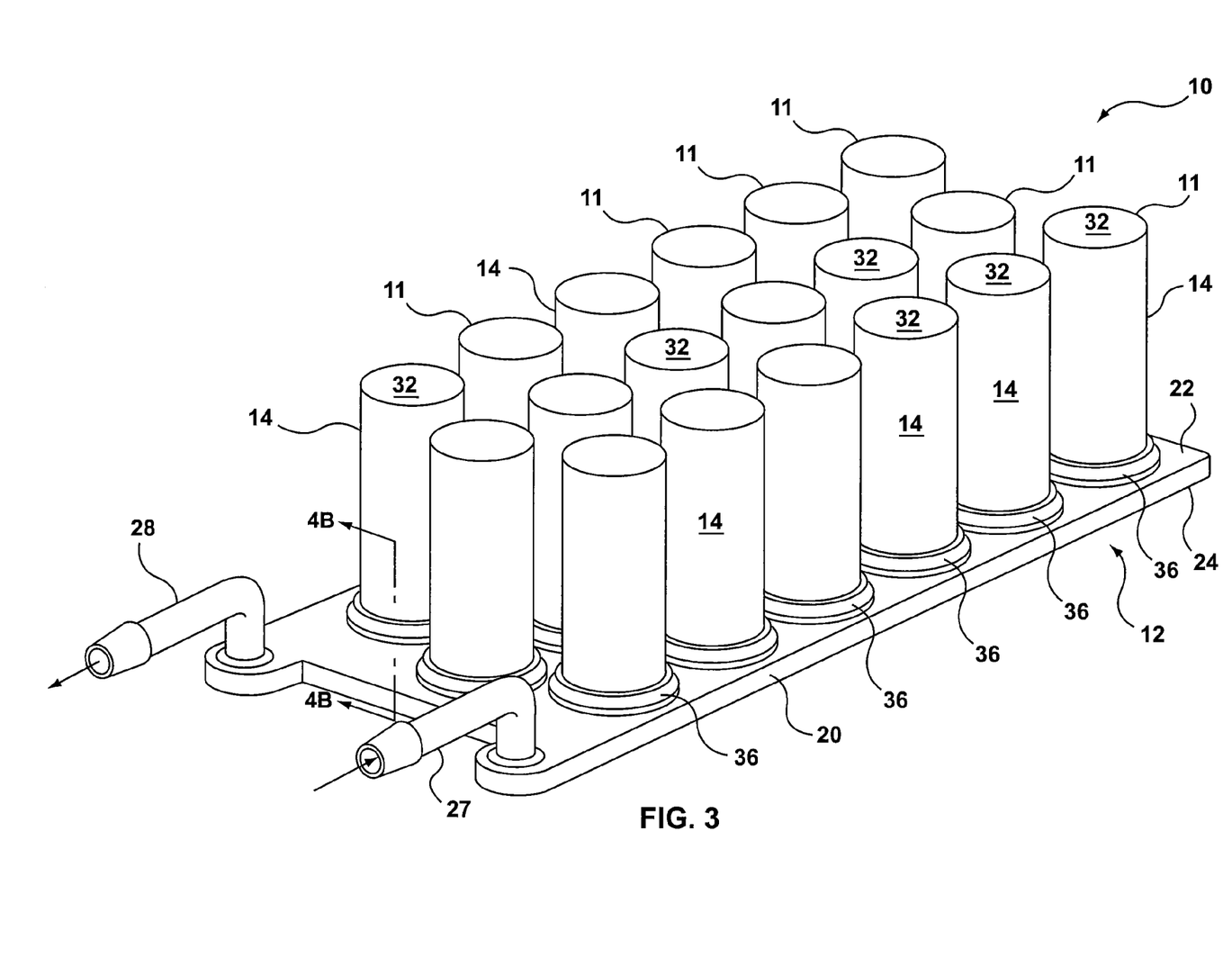
FIG. 3 is a perspective view of a battery unit and heat exchanger structure according to another example embodiment of the present disclosure.
Figure 4A:
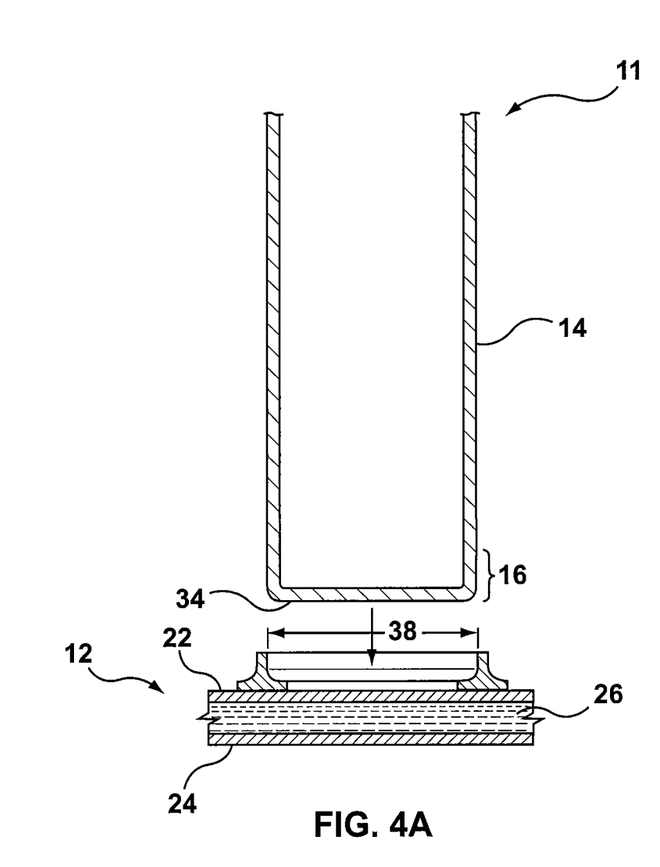
FIG. 4A is a partial sectional, assembly view taken along section line 4B-4B of FIG. 3 of one of the cylindrical battery units and a portion of the heat exchanger structure.
Figure 4B:
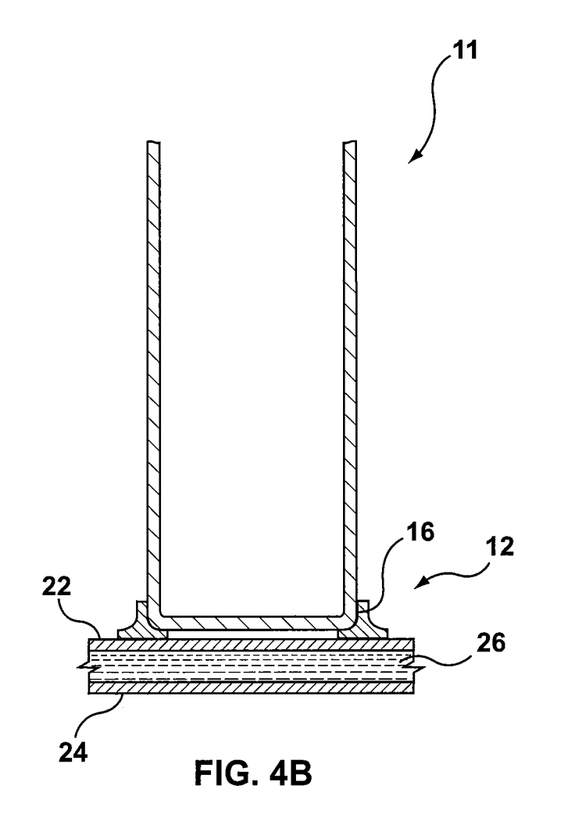
FIG. 4B is a partial sectional view taken along section line 4B-4B of FIG. 3 of the assembled battery unit and heat exchanger structure shown in FIG. 4A.

Referring now to FIGS. 3, 4A and 4B, another example embodiment of the present disclosure is provided wherein the outer housing 14 of each individual battery unit 11 is in the form of a cylindrical can with circular top and bottom surfaces 32, 34. In this embodiment, the base portion 16 of each battery unit 11 corresponds to a bottom portion of the outer housing 14 and does not constitute a separately formed component that is subsequently attached to the bottom surface of the outer housing 14, as is described in the previous embodiment. Accordingly, in the subject embodiment, the base portion 16 of the battery unit 11, itself, constitutes the first engaging device.

In the subject embodiment, the cooling plate 20 of the heat exchanger 12 is provided with one or more annular rings 36 that function as collared-openings which are attached to the outer surface of one of the first and second walls 22, 24 of the cooling plate 20 by any suitable means (i.e. welding, brazing, soldering, etc.). The annular rings 36, therefore, constitute the second engaging device and have an inner diameter 38 that is sized so as to receive the base portion 16 of the battery unit 11. Accordingly, the battery unit 11 is received within the corresponding collared-opening of the annular ring 36 provided on the cooling plate 20. In the case where a plurality of cylindrical battery units 10 are provided, each individual battery unit 10 can be mounted on and "locked" (either removably or irremovably) to the cooling plate 20. As in the previously described embodiment, the number of annular rings 36 provided on the cooling plate 20 and the manner in which they are distributed and spaced-apart on the cooling plate 20 is specifically selected to ensure that optimal cooling characteristics are achieved in accordance with known thermal resistance (conductivity) principles.

As shown more clearly in FIGS. 4A and 4B, the annular ring 36 acts like a "socket" for receiving the protruding base portion 16 or "peg" of the battery unit 11. The annular ring 36 wraps around the base portion 16 of the battery unit 11 at the intersection of, or at the transition between, the major and minor ends of the battery unit 11. This allows the annular ring 36 to more optimally conduct heat flowing along the major axis and minor axis of the battery unit 11 to the bottom surface 34 of the battery unit 10 that contacts the cooling plate 20. As a result of the mechanical interlock between the battery unit 11 and the cooling plate 20 providing the interconnection between the two components, the battery unit 11 itself may or may not be in actual physical contact with the outer surface of the first or second wall 22, 24, i.e. a gap may or may not exist between the bottom surface of the battery unit 11 and the cooling plate 20. Various prior art arrangements require actual contact between two corresponding essentially flat surfaces and will not function as required should a gap exist between the two components. In the subject embodiment, the physical interconnection between the two components (i.e. the battery unit 11 and the cooling plate 20) is provided by the first and second engaging devices regardless of whether the bottom surface of the battery unit 11 and the cooling plate 20 actually touch.

As mentioned above, while the subject embodiment has been described in connection with a battery unit 11 having an outer housing 14 in the form of a cylindrical can with circular top and bottom surfaces 32, 34 with corresponding, generally circular, collared-openings or annular 36 being provided on the cooling plate 20, it will be understood that the outer housing 12 of the battery unit 11 may be in the form of a cylindrical can with square, rectangular, triangular or any other shape of top and bottom surfaces 32, 34. Similarly, the collared-openings 36 may be formed so as to correspond to the particular shape of the battery unit 11 and are not intended to be limited to the circular rings illustrated in the drawings.

Figure 5A:
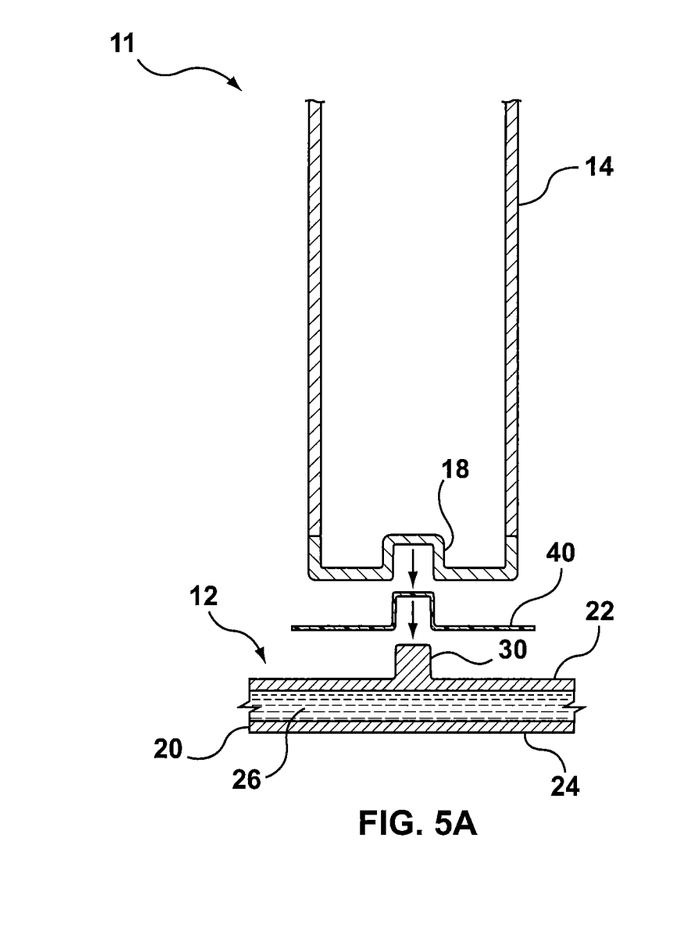
FIG. 5A is a partial sectional, assembly view, as shown in FIG. 2A, of another example embodiment of the present disclosure.
Figure 5B:
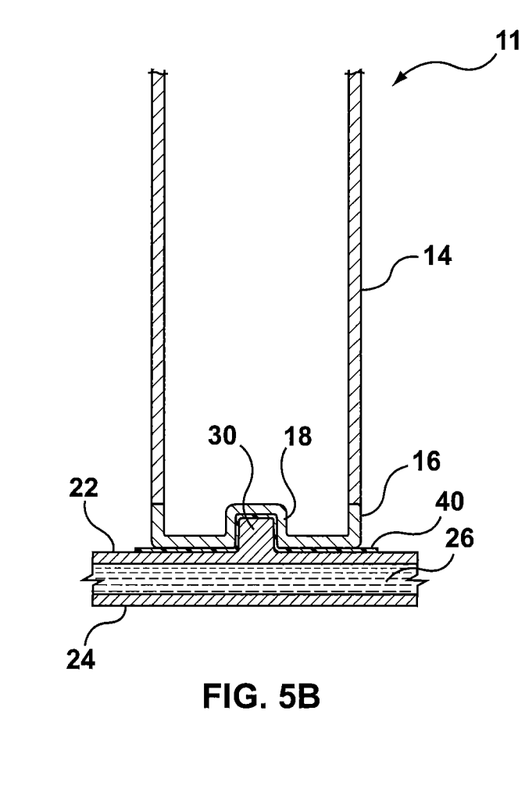
FIG. 5B is a partial sectional view, as shown in FIG. 2B, of the battery unit and heat exchanger structure of the example embodiment shown in FIG. 5A.

Referring now to FIGS. 5A and 5B, in applications where electrical isolation is required between the battery unit 11 and the cooling plate 20, the materials of construction of either the battery unit 11 or the cooling plate 20, or both, may provide the electrical isolation. However, in situations where the materials of construction (of either the battery unit 11 or cooling plate 20 or both) prevents adequate cooling due to the correspondingly lower thermal conductivity of the materials, an electrical isolation layer 40 may be inserted into the mechanical interlock region (i.e. between the battery unit 11 and the cooling plate 20) as shown in FIGS. 5A, 5B.

FIG. 6 illustrates yet another example embodiment of the battery unit and heat exchanger structure according to the present disclosure. As shown, in some embodiments battery units 11 (or cells) are spot welded to a current collector plate 42. The collector plate 42 would include or be formed with the first engaging device for receiving an interlocking element, such as the recessed openings 18. Accordingly, in the subject embodiment, the collector plate 42 would be equivalent to the base portion 16 with first engaging device for engaging with the second engaging device found on the cooling plate 20, the cooling plate 20 being formed with or including the protruding members 30 for being received in the openings 18 in the collector plate 42. While an electrical isolation layer 40 is shown in FIG. 6 as being positioned between the bottom surface of the current collector plate 42 and the top or outer surface of the cooling plate 20, the isolation layer 40 is not necessarily required.

Figure 8:
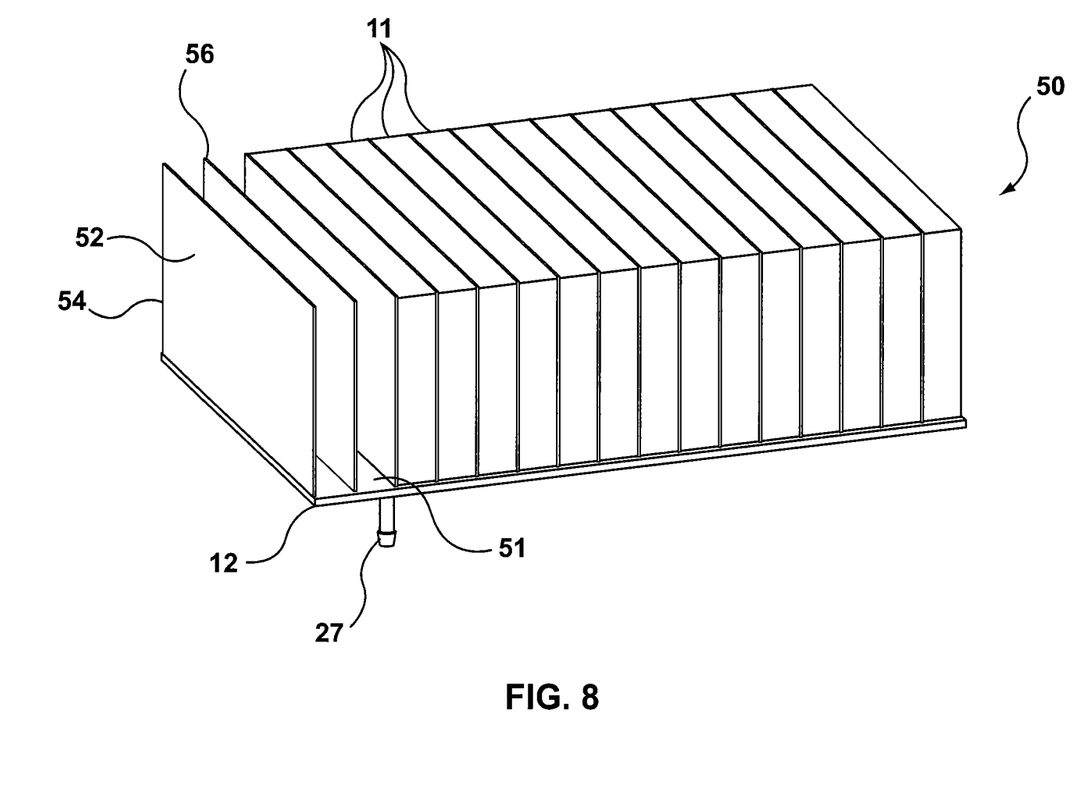
FIG. 8 is a perspective view of a heat exchanger and battery unit system according to still another example embodiment of the present disclosure, with some batteries missing to show the fins.
Figure 9:
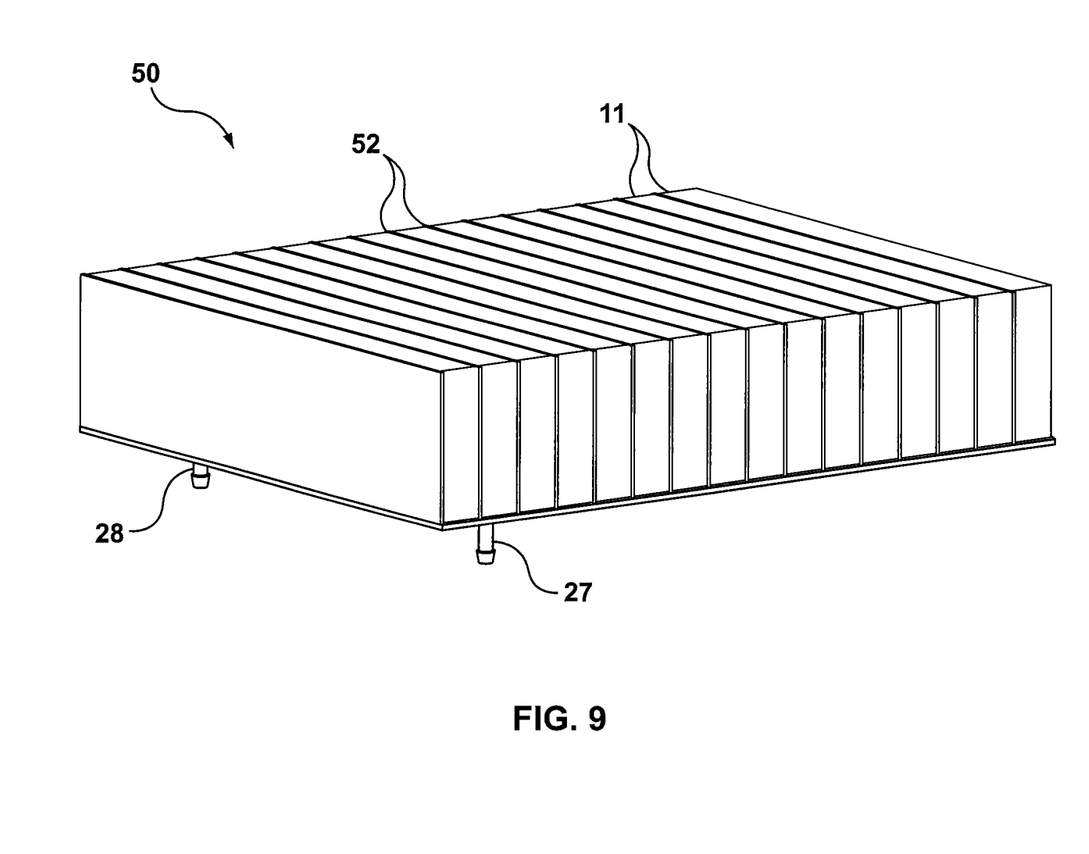
FIG. 9 is a perspective view of a heat exchanger and battery unit system according to the embodiment disclosed in FIG. 8.

Referring now to FIGS. 8 and 9, where disclosed is another example embodiment of a heat exchanger and battery unit system 50, containing at least one battery unit 11 and at least one heat exchanger structure 12.

The heat exchanger 12 is made up of spaced-apart first and second walls 22, 24 defining a fluid channel 26 therebetween, as described previously. A fluid inlet and a fluid outlet 27, 28 are also provided with the heat exchanger 12 that are in communication with the fluid channel 26, for directing fluid into and out of the fluid channel 26, as described previously. The first engaging device has a plurality of spaced-apart protruding members 52, which are coupled to a base plate 51 of the first engaging device. The plurality of spaced-apart protruding members 52 are adapted for releasably-affixing the battery unit 11. While the base plate 51 can contain recesses or peg, as described with reference to FIG. 1, to couple to the second engaging device present on the heat exchanger 12.

In this embodiment, the base portion of each battery unit 11 corresponds to a bottom portion of the outer housing 14 and does not constitute a separately formed component that is subsequently attached to the bottom surface of the outer housing 14, as is described in the previous embodiment. Further, different types of batteries, such as having the outer housing made out of a hard cover or a flexible pouch can be used. As shown in FIGS. 8 and 9, the base plate 51 of the heat exchanger 12 has a plurality of protruding members 52, which in one embodiment as shown in FIGS. 8 and 9 contains a first fin 54 and a second fin 56, with a battery unit 11 releasably-affixed between the first fin 54 and the second fin 56. In FIG. 8, some of the battery units 11 have been removed to show the first and second fins 54, 56. While FIG. 9 discloses an assembled heat exchanger and battery unit system 50, with battery units 11 present between the plurality of the protruding members 52.

The method of attaching the plurality of protruding members 52 to the base plate 51 is not particularly limited. In one embodiment, the plurality of protruding members 52 are brazed, soldered, welded or mechanically attached to the base plate 51.

Figure 10:
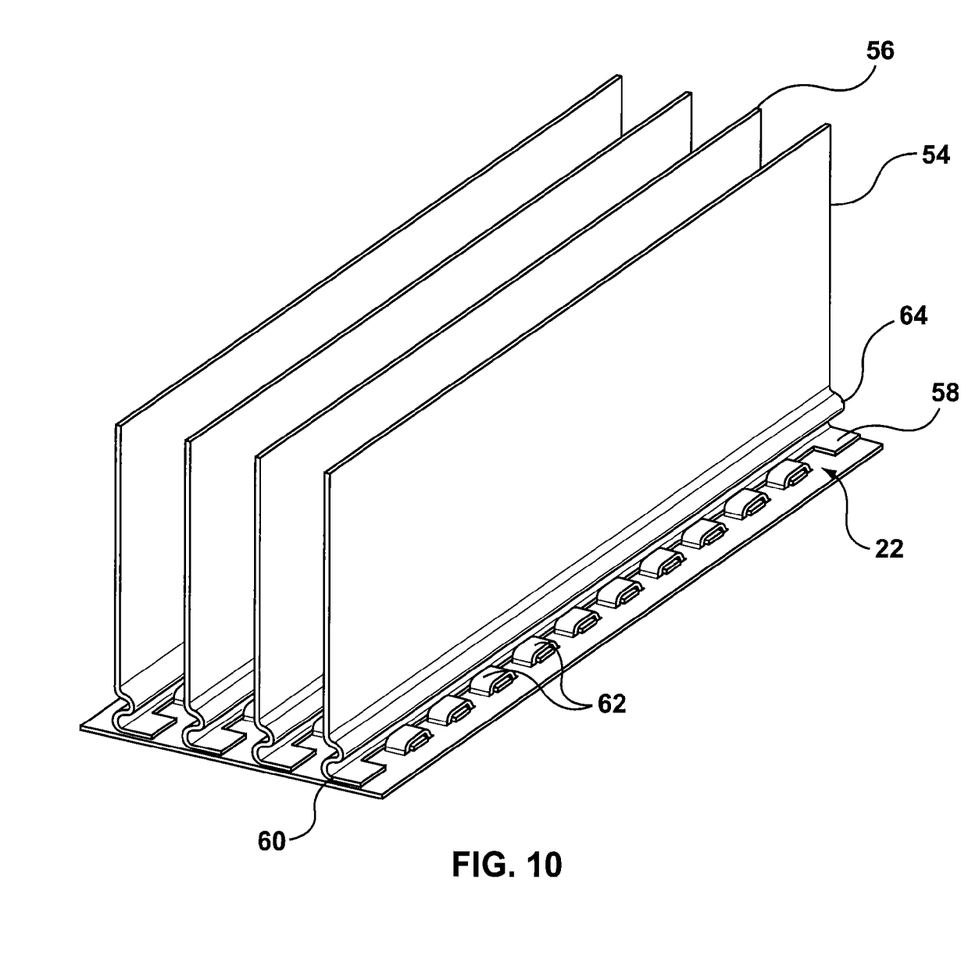
FIG. 10 is a perspective view of a first wall of a heat exchanger and a heat exchanger and battery unit system according to another further example embodiment of the present disclosure.

FIG. 10 discloses another example embodiment of the heat exchanger and battery unit system 50, where the first engaging device is a plurality of protrusion members, which in one example embodiment as shown in FIG. 10 contain fins 54, 56 that are provided with one or more pins 58 that project from a base 60 of the fins 54, 56, for coupling the fins 54, 56 to, for example, the first wall 22 of the heat exchanger 12. Accordingly, the first wall 22 of the heat exchanger 12 is provided with one or more brackets 62 for receiving the pins 58 so that the fins 54, 56 are coupled to the first wall 22 of the heat exchanger 12. In addition to the mechanical attachment, the fins 54, 56 could still be brazed, welded or soldered, so that the fins 54, 56 cannot be easily removed from the first wall 22, when the heat exchanger is not in use.

The shape and number of pins 58 on the protruding members 52 is not particularly limited, and can be set depending upon the particular application and requirements of the heat exchanger 12 and the heat exchanger and battery unit system 50. Similarly, the shape of brackets 62 is not particularly limited, as long as they are sufficiently complementary for receiving the pins 58 to couple the fins 54, 56 to the first wall 22. Also, the number of brackets 62 is not particularly limited, and can be more or less than the number of pins 58, so long as the fins 54, 56 can be coupled to the first wall 22. In the embodiment shown in FIG. 10, the pins 58 positioned at the ends of the fins 54, 56 do not engage a bracket 62.

In the heat exchanger 12 and the heat exchanger and battery unit system 50, the battery unit 11 can be releasably-affixed to the protruding members 52. In the embodiment disclosed in FIGS. 8 and 9, one or more battery units 11 can be sandwiched between the first fin 54 and the second fin 56 for frictionally retaining the one or more battery units 11 in place. The spacing between the fins 54, 56 is not particularly limited and is established to ensure that the fins 54, 56 are in contact with the battery unit 11 for transfer of heat from the battery unit 11 to the heat exchanger 12, and also to hold the battery unit 11 in place.

As shown in the embodiment disclosed in FIG. 10, the fins 54, 56 can be provided with biasing means 64 that can assist with releasably-affixing the battery unit 11 to the heat exchanger 12. Such biasing means 64 can also assist in preventing deformation of the fins 54, 56, while the battery unit 11 is being positioned between the fins 54, 56. The biasing means 64 present on the fins are not particularly limited and can be determined depending upon the particular application and requirements of the heat exchanger and battery unit system 50. The biasing means 64 shown in FIG. 10 can be formed by providing the fins 54, 56 with a serpentine bend, such as an S-shaped structure. The position of the biasing means 64 is also not particularly limited. In one embodiment, as shown in FIG. 10, the biasing means 64 are present at the base 60 of the fins 54, 56.

In an alternate embodiment, the battery unit 11 can be affixed to the fins 54, 56, such that the battery unit 11 and the fins 54, 56 form a unit that can be coupled together to the first wall 22 of the heat exchanger 12. In such an embodiment, the battery unit 11 is affixed to the fins 54, 56 so that it cannot be separated from the fins 54, 56 without deforming or affecting the fins 54, 56 or the battery unit 11.

The shape and number of fins 54, 56 present in the heat exchanger 12 or the heat exchanger and battery unit system 50 are not particularly limited and can be established depending upon the requirements of the application. In the embodiment disclosed in FIGS. 8 and 9, the fins 54, 56 are formed by flat plate like structures, each of which is in contact with an entire face of the battery unit 11 to assist in heat transfer. However, other embodiments, such as a comb-like fin structure or half-fin that is contact with only half the face of a battery unit 11 can also be used. The fins 54, 56 disclosed in FIGS. 8 and 9, however, can assist in transferring heat from an entire face surface of the battery unit 11. In addition, the first and second fins 54, 56 can be identical, as shown in FIGS. 8-10, or different.

The number of battery units 11 in the heat exchanger and battery unit system 50 is not particularly limited and can be established considering the application and the requirements of the heat exchanger and battery unit system 50. In one embodiment, a single battery unit 11 is releasaby-affixed by a plurality of protruding members 52. In the embodiment disclosed in FIGS. 8-10, one or more battery units 11 can be positioned between the first and second fins 54, 56. The type of battery unit 11 in the heat exchanger and battery unit system 50 is also not particularly limited and can be established considering the requirements of the heat exchanger and battery unit system 50. In one embodiment, the battery has a hard outer shell. In another embodiment, flexible batteries or battery units can be used.

The heat transfer from the battery unit 11 can take place through the protruding members 52, such as the fins 54, 56 that are in contact with the battery unit 11 and the first wall 22 of the heat exchanger 12. The pins 58 present on the fins 54, 56 can provide additional surface area for contact with the first wall 22 of the heat exchanger 12 and also can assist in improving the heat transfer efficiency. In addition, the battery unit 11 can itself have a face that is in contact with the first wall 22 of the heat exchanger 12, such as that shown in FIGS. 8 and 9. In the embodiment disclosed in FIG. 10, the heat exchanger and battery unit system 50 can have a gap between the first wall 22 of the heat exchanger 12 and the battery unit 11. The biasing means 64, as disclosed in FIG. 10, can further assist to ensure that the battery unit 11 avoids contact with the first wall 22 of the heat exchanger 12.

The various embodiments presented above are merely examples and are in no way meant to limit the scope of this disclosure. Variations of the innovations described herein will be apparent to persons of ordinary skill in the art, such variations being within the intended scope of the present application. Accordingly, it will be understood that the subject matter described herein and in the recited claims intends to cover and embrace all suitable changes in technology.

What is claimed is:

1. A heat exchanger and battery unit structure, comprising:
    at least one battery unit having an outer housing, the outer housing having a base portion;
    at least one heat exchanger plate pair comprising first and second spaced-apart walls that are sealingly joined together at their periphery so as to define an enclosed fluid channel between said first and second walls, the heat exchanger plate further comprising a fluid inlet formed therein in fluid communication with an inlet end of said enclosed fluid channel and a fluid outlet formed therein in fluid communication with an outlet end of said enclosed fluid channel for inletting and discharging a liquid fluid to and from said enclosed fluid channel, said enclosed fluid channel extending between said inlet end and said outlet end between said first and second walls, wherein one of said first and second walls defines a primary heat transfer surface for heat exchange with said at least one battery unit;
    a first engaging device formed as part of a bottom surface of the base portion of the battery unit;
    a second engaging device formed on an outer surface of and extending away from the primary heat transfer surface defined by one of said first and second walls that define the enclosed fluid channel of the heat exchanger plate;
    wherein one of the first engaging device and the second engaging device is received within and mechanically engages the other of the first engaging device and the second engaging device such that the mechanical engagement between the first engaging device and the second engaging device secures the base portion of the at least one battery unit to the primary heat transfer surface of said at least one heat exchanger plate; and
    wherein the corresponding first and second engaging devices are arranged so that their spatial distribution across the primary heat transfer surface minimizes thermal resistance between the at least one battery unit and the at least one heat exchanger plate; and wherein the surface area of the primary heat transfer surface underneath the base portion of the at least one battery unit is greater than the surface of the second engaging device in contact with first engaging device of the at least one battery unit.

2. The heat exchanger and battery unit structure as claimed in claim 1, wherein the base portion is formed separately to the outer housing and affixed to the outer housing.

3. The heat exchanger and battery unit structure as claimed in claim 2, wherein the base portion is welded, brazed or soldered to the outer housing of the at least one battery unit.

4. The heat exchanger and battery unit structure as claimed in claim 2, wherein the base portion is an extruded body that is separate to and affixed to the outer body of the at least one battery unit.

5. The heat exchanger and battery unit structure as claimed in claim 1, wherein the at least one battery unit and the at least one heat exchanger plate are removably locked together.

6. The heat exchanger and battery unit structure as claimed in claim 1, wherein the at least one battery unit and the at least one heat exchanger plate are irremovably locked together.

7. The heat exchanger and battery unit structure as claimed in claim 1, wherein the battery unit is cylindrical having top and bottom surfaces, wherein the top and bottom surfaces are in the form of one of the following alternatives: rectangular, circular, square, triangular, or any other prismatic form.

8. The heat exchanger and battery unit structure as claimed in claim 1, wherein the first engaging member is in the form of a recessed opening that extends from said bottom surface into the base portion of the at least one battery unit and the second engaging member is in the form of a protruding member that extends from the outer surface of the at least one of the first and second walls that define the fluid channel of the heat exchanger plate.

9. The heat exchanger and battery unit structure as claimed in claim 1, wherein the first engaging device is at a bottom portion of the outer housing of the battery unit and the second engaging device is in the form of a collar, the collar extending away from the outer surface of the at least one of the first and second walls that define the fluid channel of the heat exchanger plate and defining a central opening, the bottom portion of the at least one battery unit being received in the central opening and engaging the collar for securing said at least one battery unit to said at least one heat exchanger plate.

10. The heat exchanger and battery unit structure as claimed in claim 1, wherein the outer housing of the battery unit is in the form of a cylindrical can having circular top and bottom surfaces and the first engaging device is the base portion of the outer housing, the second engaging device being in the form of an annular ring attached to the outer surface of the at least one of the first and second walls of the heat exchanger plate.

11. The heat exchanger and battery unit structure as claimed in claim 1, wherein the first engaging device comprises a base plate having a plurality of spaced-apart protruding members that extend away from a first surface of said base plate, the at least one battery unit being received between said spaced-apart protruding members so that the bottom surface of the outer housing contacts and rests against the first surface of said base plate, the plurality of spaced-apart protruding members adapted for releasably-affixing the at least one battery unit to the base plate; and
wherein said base plate has a second surface generally opposed to said first surface, said second surface of said base plate mechanically engaging with said second engaging device.

12. The heat exchanger and battery unit system as claimed in 11, wherein the protruding member is a fin.

13. The heat exchanger and battery unit system as claimed in claim 11, wherein the plurality of protruding members comprise a first fin and a second fin, the first and second fins defining a casing for releasably-affixing the battery unit; and wherein the second surface of the base plate further defines a recessed opening, and wherein the second engaging member is in the form of a protruding member that extends from the outer surface of the at least one of the first and second walls that define the fluid channel of the heat exchanger plate, the second engaging device being received in and mechanically engaging the recessed opening of the base plate of the first engaging device.

14. The heat exchanger and battery unit system as claimed in claim 1, wherein the first engaging device comprises a fin for engaging a lateral surface of the at least one battery unit, each fin further comprising a plurality of spaced-apart pins projecting from a base portion of each fin for coupling to and/or mechanically engaging the second engaging device of the first or second wall of the heat exchanger plate.

15. The heat exchanger and battery unit system as claimed in claim 14, wherein the second engaging device comprises one or more brackets formed on and projecting away from the surface of the first wall of the at least one heat exchanger plate, each bracket adapted for receiving a corresponding one of the plurality of pins, the pins and brackets mechanically engaging with one another so as to secure the at least one battery unit to the heat exchanger plate.

16. A heat exchanger comprising:
spaced-apart first and second walls sealingly joined together at their periphery and defining an enclosed fluid channel therebetween, the heat exchanger having a fluid inlet in fluid communication with an inlet end of said enclosed fluid channel and a fluid outlet in fluid communication with an outlet end of said enclosed fluid channel, said enclosed fluid channel extending between said inlet end and said outlet end between said first and second walls, wherein one of said first and second walls defines a primary heat transfer surface for heat exchange with said at least one battery unit;
a second engaging device formed on an outer surface of and extending away from the primary heat transfer surface defined by one of said first and second walls that define the enclosed fluid channel of the heat exchanger for coupling to and mechanically engaging with a first engaging device formed on or attached to an outer housing of a battery unit arranged on said primary heat transfer surface;
wherein the mechanical engagement between the first and second engaging devices secures the base portion of said battery unit in heat transfer relationship to said primary heat transfer surface of said heat exchanger; and
wherein the second engaging device is one of a plurality of second engaging devices, the second engaging devices being arranged so that their spatial distribution across the primary heat transfer surface for engagement with corresponding first engaging devices minimizes thermal resistance between the heat exchanger and said at least one battery unit; and wherein the surface area of the primary heat transfer surface underneath the base portion of the at least one battery unit is greater than the surface of the second engaging device in contact with first engaging device of the at least one battery unit.

17. A heat exchanger as claimed in claim 16, wherein the first engaging member is in the form of a recessed opening that extends into a base portion of the battery unit and wherein the second engaging member is in the form of a protruding member that extends from an outer surface of one of the first and second walls that define the fluid channel of the heat exchanger.

18. The heat exchanger as claimed in claim 16, wherein the second engaging device is in the form of a collar, the collar extending away from an outer surface of one of the first and second walls that define the fluid channel of the heat exchanger plate and defining a central opening for receiving and engaging with a bottom portion of the battery unit.

19. The heat exchanger as claimed in claim 16, wherein the second engaging device comprises one or more brackets formed on and projecting away one of the first and second walls that define the fluid channel of the heat exchanger plate, each bracket adapted for receiving a corresponding first engaging device on said battery unit.

* * * * *